(12) United States Patent
Weh et al.

(10) Patent No.: US 8,875,734 B2
(45) Date of Patent: Nov. 4, 2014

(54) HIGH-PRESSURE CONNECTION

(76) Inventors: Erwin Weh, Illertissen (DE); Wolfgang Weh, Illertissen (DE)

( * ) Notice: Subject to any disclaimer, the term of this patent is extended or adjusted under 35 U.S.C. 154(b) by 0 days.

(21) Appl. No.: 13/808,376

(22) PCT Filed: Jun. 18, 2011

(86) PCT No.: PCT/EP2011/003027
§ 371 (c)(1),
(2), (4) Date: Jan. 4, 2013

(87) PCT Pub. No.: WO2012/003927
PCT Pub. Date: Jan. 12, 2012

(65) Prior Publication Data
US 2013/0099486 A1 Apr. 25, 2013

(30) Foreign Application Priority Data
Jul. 5, 2010 (DE) .................... 20 2010 009 871 U

(51) Int. Cl.
*F16K 17/04* (2006.01)
*F16J 15/10* (2006.01)
*F16K 15/02* (2006.01)
*F16L 37/40* (2006.01)

(52) U.S. Cl.
CPC ............. *F16L 37/40* (2013.01); *F16J 15/104* (2013.01); *F16K 15/026* (2013.01)
USPC ................ 137/538; 137/516.25; 137/516.29; 251/368; 251/332; 251/364

(58) Field of Classification Search
CPC ......... F16K 1/46; F16K 24/005; F16K 1/443; F04B 53/1087; F01L 3/00
USPC ........ 137/516.29, 538, 516.25; 251/332, 363, 251/333, 364, 368
See application file for complete search history.

(56) References Cited

U.S. PATENT DOCUMENTS

| 191,481 | A | * | 5/1877 | Scoville .......................... 280/14 |
| 2,060,748 | A | * | 11/1936 | Roberts et al. ................ 251/332 |

(Continued)

FOREIGN PATENT DOCUMENTS

| AU | 2009 100 267 A4 | 4/2009 |
| DE | 20 2007 010788 U1 | 9/2008 |

(Continued)

OTHER PUBLICATIONS

International Search Report for PCT/EP2011/003027, dated Nov. 2011.
International Search Report dated Nov. 15, 2011 for PCT Application No. PCT/EP2011/003194, corresponding to U.S. Appl. No. 13/807,448.
International Preliminary Report on Patentability dated Jan. 8, 2013 for PCT Application No. PCT/EP2011/003194, corresponding to U.S. Appl. No. 13/807,448.
International Preliminary Report on Patentability dated Jan. 8, 2013 for PCT Application No. PCT/EP2011/003027, corresponding to U.S. Appl. No. 13/808,376.

*Primary Examiner* — Kevin Lee
*Assistant Examiner* — P. Macade Nichols
(74) *Attorney, Agent, or Firm* — Knobbe, Martens, Olson & Bear LLP

(57) ABSTRACT

The invention relates to the simple and safe construction of a high-pressure connection (1) for transferring gaseous and/or liquid media, in particular for the refuelling of vehicles with hydrogen. According to the invention, the high-pressure connection (1) comprises a housing (2) with a media passage (P) and a leaktight piston (3) of which the front end is disposed in a sealing manner with respect to an annular seal. The seal (4) has a seal support (4a) in which is inserted a sealing insert (4b), the sealing support (4a) consisting of a harder plastics and the sealing insert (4b) consisting of a softer plastics.

8 Claims, 1 Drawing Sheet

(56) References Cited

U.S. PATENT DOCUMENTS

Figure 1:
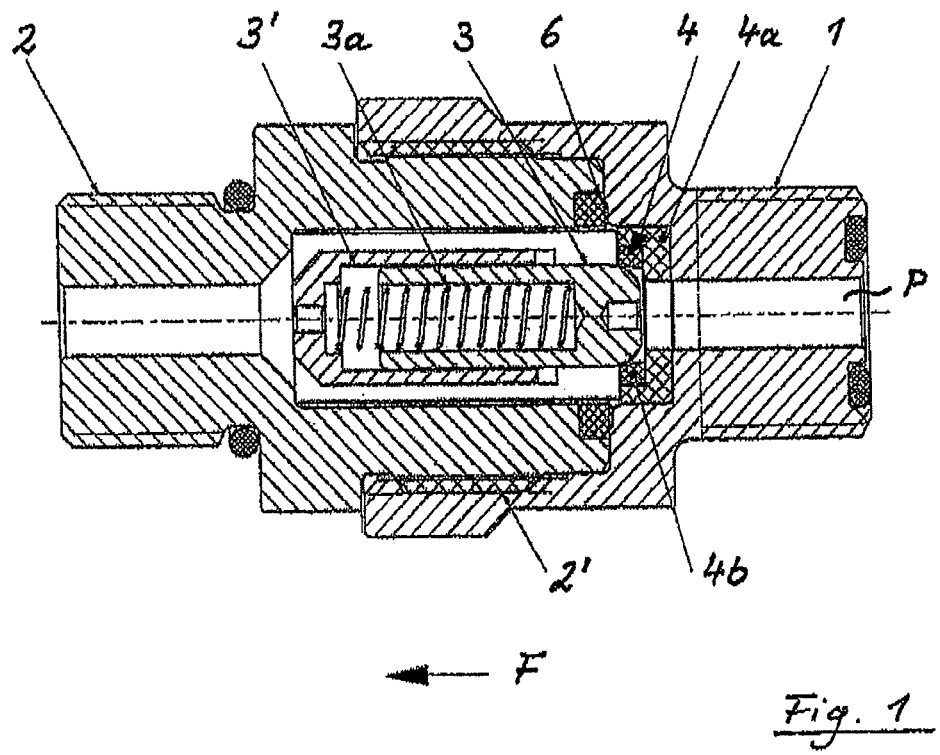

| | | | |
|---|---|---|---|
| 2,959,188 A | 11/1960 | Kepner | |
| 3,523,553 A | 8/1970 | Beck et al. | |
| 4,474,208 A * | 10/1984 | Looney | 137/516.29 |
| 5,060,982 A | 10/1991 | Matsushita | |
| 5,265,844 A | 11/1993 | Westfall | |
| 5,575,510 A | 11/1996 | Weh et al. | |
| 6,095,186 A * | 8/2000 | Nagel | 137/516.29 |
| 6,189,862 B1 * | 2/2001 | McKay | 251/363 |
| 6,719,003 B2 * | 4/2004 | Schroeder et al. | 137/322 |
| 2006/0021659 A1 | 2/2006 | Anderson | |
| 2008/0018059 A1 | 1/2008 | Otuka | |
| 2009/0267014 A1 * | 10/2009 | Ishitoya et al. | 251/359 |

FOREIGN PATENT DOCUMENTS

| | | |
|---|---|---|
| EP | 1 577 598 A1 | 9/2005 |
| FR | 2686680 | 7/1993 |
| WO | WO 2012/000659 | 1/2012 |
| WO | WO 2012/003927 | 1/2012 |

* cited by examiner

HIGH-PRESSURE CONNECTION

The invention relates to a high-pressure connection for transferring of gaseous and/or liquid media, in particular for refueling of vehicles with hydrogen, comprising the pre-characterizing features of claim 1.

Such high-pressure connections are provided for secure transfer of a fluid from a pressure source, for example from a filling system. Important is a leak-free design to avoid discharge to the environment, especially at high pressures of up to 700 bar and more.

Of particular importance is a leak-free seal of check valves in such high-pressure connections. However, with raising pressure values of 700 bar and more, these ports are increasingly sensitive to leakage, such that a discharge of such cryogenic hydrogen gas has to be expected. This could cause an accident, especially leaks in pressurized lines might cause substantial damages. One reason is that the commonly used PTFE seals are resistant to cold, but have at constant pressure negative impacts on deformation (so-called "cold flow", cf. homepage of the Elring-company). Thus, it is proposed to use PTFE compounds with enhanced pressure stability, for example with carbon or glass fibers as a filler. However, a deformation of less than 10% is difficult to reach. Further, composite seals are known from ball valves and include graphite layers. These seals are however mostly designed for higher temperatures.

Thus, the invention is based on the object to improve safety of a high-pressure connection with a simple construction and to avoid risks or damage.

This problem is solved by a high-pressure connection according to the features of claim 1. Preferred embodiments of the invention are the subject of dependent claims.

The proposed high-pressure connection is characterized by a particularly high security and easy construction, since the two-part design of the seal carrier and the sealing insert can be optimally adapted to the requirements at high pressure. Thus, the seal carrier is made of a harder plastic, in particular PEEK, and the sealing insert consists of a softer plastic, in particular PTFE. The terms "harder-softer" can be accurately defined by the modulus of elasticity (E or Young's modulus) can. Regular plastics such as polyester (PE) or polypropylene (PP) have a modulus of elasticity of about 1 to 2 kN/mm². The preferred materials of PEEK (polyetherketones) are at about 4 kN/mm² and PTFE is approximately at 0.6 kN/mm². This results in a double or two-stage seal, in particular when two sealing edges are provided on the sealing ring, in particular one on the "softer" sealing insert and one on the "harder" seal carrier. Thus, the PTFE "hugs" the sealing of the piston of the check valve and with increasing "cold flow" (depending on the exposure time, the pressure value and temperature), the sealing is additionally s$_{up}$ported by the sealing edge on the PEEK seal carrier. This results in a very good seal even at high pressures of 700 bar and more, namely a double seal towards the check valve piston, on the one hand in the low pressure area to the "softer" sealing insert and on the other hand in the high pressure region predominantly "stiffer" against the seal carrier. Thus, a failure of the ring seal can be prevented and the proposed high-pressure connection can avoid, that gas or liquid escapes at secure long-term. This is particularly important for accident protection reasons, but also for the environment.

It should be noted that the proposed high-pressure connection is suitable for couplings, in particular for vehicle refueling connections in vehicle, but also in industrial plants. This high-pressure connection can be installed at any location in a compact manner and have other valves as check valves. An exemplary embodiment is based on the accompanying drawings explained and described below. Herein shows:

FIG. 1 a linear high-pressure connection in a longitudinal section, and

Figure 2:
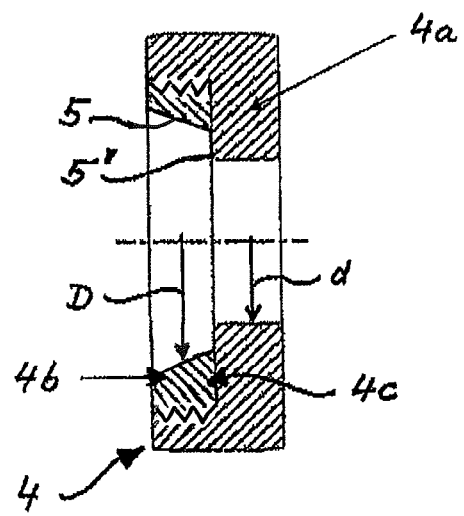

FIG. 2 an enlarged view of the ring seal of FIG. 1.

FIG. 1 shows an embodiment of a high-pressure connection 1 with a two-part housing 2, which is here screwed with a thread 2' to form at the right side an inlet to a passage P. The medium, in particular a gas, flows to the left according to the arrow F, to be forwarded to a non-illustrated pressure tank. In the interior of the housing 2, in addition to conventional O-ring seals 6, a check valve 3' is provided, that contacts with its sealing piston 3 or its front end to a ring seal 4, thus tightly sealing against the flow direction F. The sealing piston 3 is here biased by a spring 3a and is pressed to the right, in this case.

The novel seal 4 is made of two parts, namely a seal carrier 4a, into which a sealing insert 4b is inserted. The seal carrier 4a consists of a harder plastic and the seal insert 4b of a softer plastic. Preferably, the seal carrier 4a is formed from PEEK plastic and the sealing insert 4b is made of PTFE. In an advantageous embodiment, the seal carrier 4a has a graded ring shape with a step 4c (cf. FIG. 2), wherein the sealing insert 4b is mounted in this step 4c, in particular in a screwed manner. This results in a secure seal of the gaps and to the environment.

In FIG. 2 the sealing insert 4b has a larger inner diameter D than the passage d (here corresponding to the cross section of the passage P) of the seal carrier 4a and preferably the sealing insert 4b has a conical inner shape, which widens towards the sealing piston 3. Thus, a streamlined transfer of the medium achieved, but also a reliable sealing engagement of the front end of the sealing piston 3, which can be rounded (see FIG. 1). In addition, the seal 4 has two "cascaded" sealing edges 5, 5', in particular one on the sealing insert 4b and one on the seal carrier 4a.

The housing 2 can be adapted to the fluid to be transferred, in particular as to the desired feed angle, passage cross-sections, etc., for example, can be designed in a cranked or angled way. Preferably, the sealing insert 4b and thus its annular sealing edge 5 is made of PTFE, while the seal carrier 4a and its sealing edge 5' is produced from PEEK (polyether etherketone), as this durable material offers high chemical resistance and impermeability even at extremely low temperatures and/or high pressures.

The invention claimed is:

1. A high-pressure connection for transferring gaseous and/or liquid media comprising:
    a housing having a media passage and a sealing piston having a front end, wherein the front end contacts a ring seal in a first position, the ring seal comprising a seal carrier into which a sealing insert is inserted, the sealing insert having a conical inner shape widening towards the sealing piston, wherein the seal carrier is made of a harder plastic and the seal insert is made of a softer plastic, wherein the seal carrier is exposed to a high pressure region of the media passage and the sealing insert is exposed to a low pressure region of the media passage when the front end is in the first position, and wherein the front end contacts both the seal carrier and the sealing insert in the first position under cold flow conditions of the sealing insert.

2. The high-pressure connection according to claim 1, wherein the seal carrier is made of PEEK.

3. The high-pressure connection according to claim 1, wherein the sealing insert is made of PTFE.

4. The high-pressure connection according to claim 1, wherein the seal carrier has a stepped annular shape with a step, and wherein the sealing insert is mounted in the step.

5. The high-pressure connection according to claim 1, wherein the sealing insert has a larger inner diameter than a diameter of a passage of the seal carrier.

6. The high-pressure connection according to claims 1, wherein the seal has two sealing edges the first of the sealing edges on the sealing insert and the second of the sealing edges on the seal carrier.

7. The high-pressure connection according to claim 2, wherein the sealing insert is made of PTFE.

8. The high-pressure connection according to claim 4, wherein the sealing insert is screwed into the step.

* * * * *